Feb. 15, 1938.    R. HUTCHINGS    2,108,586
POWER TRANSMISSION MECHANISM
Filed March 29, 1937    3 Sheets-Sheet 1

Inventor
Roe Hutchings

Attorney

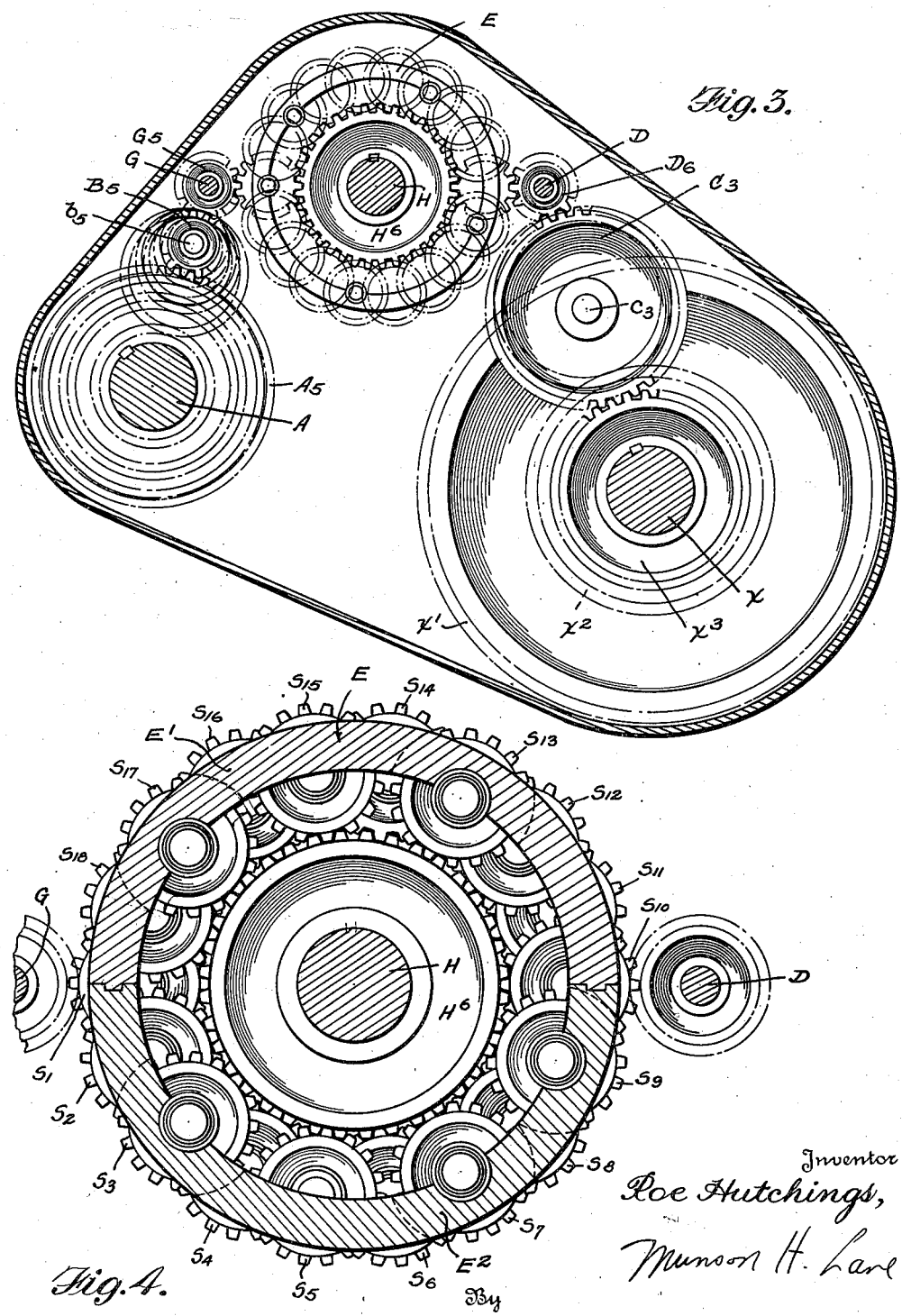

Feb. 15, 1938.            R. HUTCHINGS            2,108,586
POWER TRANSMISSION MECHANISM
Filed March 29, 1937            3 Sheets-Sheet 3

Inventor
Roe Hutchings
By
Marion H. Lane.
Attorney

Patented Feb. 15, 1938

2,108,586

UNITED STATES PATENT OFFICE 2,108,586

POWER TRANSMISSION MECHANISM

Roe Hutchings, Washington, D. C.

Application March 29, 1937, Serial No. 133,731

3 Claims. (Cl. 74—353)

The invention relates to mechanism for operatively connecting a driving shaft to a driven shaft, wherein the rate of rotation of the driven shaft may be increased or decreased in relation to that of the driving shaft.

One of the objects of the invention is to improve the transmission mechanism. Another object is to provide means whereby the rate of rotation of the driven shaft may be automatically varied with reference to the driving shaft according to the speed of said driving shaft, which is variable in accordance with the load imposed and the fuel supplied.

The invention is particularly concerned with transmission mechanism for motor vehicles and includes electrical controls actuated by a centrifugal governor located upon or in connection with the engine shaft; which controls serve to make or break a circuit including an electric motor which periodically turns a sleeve for a predetermined distance, such sleeve carrying a gear assembly which serves to vary the speed ratio between the driving and driven shafts.

The invention will be more readily understood by reference to the accompanying drawings in which are set forth an illustrative embodiment of the invention.

In the drawings:

Fig. 3 is a section on line 3—3 of Fig. 1.

Fig. 4 is a section on the line 4—4 of Fig. 1.

Figs. 5 to 13 inclusive are diagrammatic views illustrating the positions which the various gears assume for nine different speed ratios.

Figure 14:
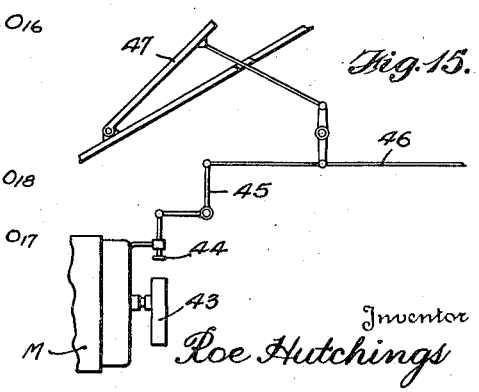

Fig. 14 is a detailed view showing the two halves of the sleeve forming an important part of the mechanism.

Figure 15:
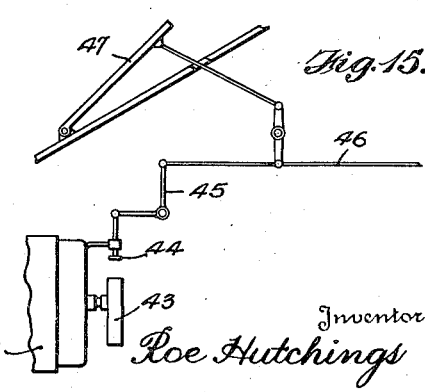

Fig. 15 is a diagrammatic view illustrating the connection between a cam on the end of the motor shaft and the accelerator and the gasoline feed control.

Figures 1, 2, 16:
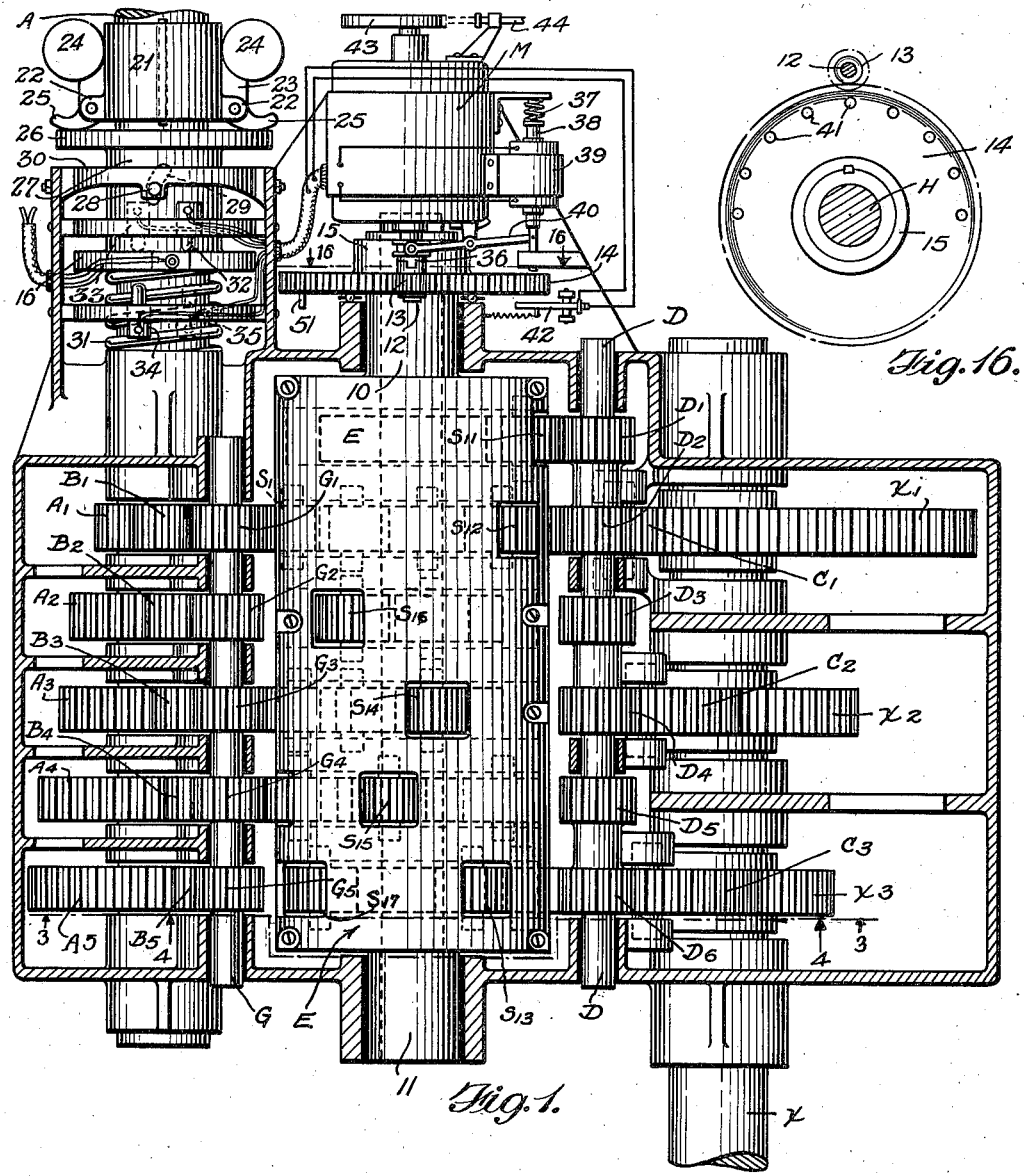
Fig. 1 is a horizontal sectional view through the transmission of an automobile, showing my improved automatically controlled mechanism.
Fig. 2 is a diagrammatic view illustrating the operation of the electrical controls.

Fig. 16 is a detailed section on the line 16—16 of Fig. 1.

In the drawings A designates a driving shaft which is rotated from the engine. X represents a driven shaft adapted to be rotated at varying speed ratios with reference to the driving shaft, through intermediate transmission mechanism.

It will be noted by reference to Figs. 1 and 5 to 13 inclusive that five gears are mounted on the shaft A. These gears are designated as $A_1$, $A_2$, $A_3$, $A_4$, and $A_5$ all being keyed to the shaft and of progressively increasing diameter, reading from the top of the figure downwardly.

The driven shaft X is provided with three gears $X_1$, $X_2$ and $X_3$ all splined to the shaft and of progressively decreasing diameter from the top of the figure to the bottom.

Constantly meshing with the gears $A_1$ to $A_5$ on the shaft A are a series of auxiliary gears $B_1$, $B_2$, $B_3$, $B_4$ and $B_5$ mounted on stub shafts $b_1$, $b_2$, $b_3$, $b_4$ and $b_5$. These gears may be either mounted to rotate freely on their shafts, or may be keyed to the shafts and the shafts will then rotate in their bearings. The gears are so arranged and of such size that these gears while constantly in mesh with the gears on the shaft A are also in mesh with a series of gears $G_1$, $G_2$, $G_3$, $G_4$ and $G_5$, mounted on shaft G, all of the G gears being of the same size and loosely mounted on the shaft.

Likewise a series of auxiliary gears $C_1$, $C_2$ and $C_3$ are mounted on stub shafts $C_1$, $C_2$ and $C_3$ and constantly mesh with the gears on shaft X and also each auxiliary gear is constantly in mesh with one of a series of pairs or couplets mounted on shaft D. These gears may also rotate on their respective shafts or the shafts can turn in their bearings. These gears $D_1$, $D_2$; $D_3$, $D_4$; $D_5$ and $D_6$ are all of the same size and are arranged in couplets $D_1$ and $D_2$—$D_3$ and $D_4$—$D_5$ and $D_6$, the couplets or pairs being loosely mounted on the shaft D but the members of each pair being secured together.

Between the shafts G and D is a gear assembly which is one of the characteristic features of my invention, such gear assembly being adapted to be rotated as a unit through a predetermined angle herein described as 20 degrees, for the purpose of altering the gear ratio between the driving and driven shafts.

The gear assembly includes a sleeve E, shown as composed of two halves $E_1$ and $E_2$, the halves being adapted to be clamped together, and being provided with a series of openings, 18 in number, arranged about the periphery of the cylinder, the openings being designated as $O_1$ to $O_{18}$ inclusive and being arranged 20 degrees apart so that they extend about the entire circumference and also extend from end to end in staggered relation, as indicated in Figs. 1, 4 and 5-13 inclusive. A series of gears $S_1$ to $S_{18}$ inclusive are mounted on stub shafts carried by the sleeve and are installed so that a portion of each gear projects through one of the staggered openings, while at the same time meshing with one of a series of six gears $H_1$ to $H_6$ of equal size, keyed to a shaft H whose ends extend through the reduced extensions 10 and 11 on the ends of the sleeve E.

Means are provided for rotating the sleeve E and the gears $S_1$ to $S_{18}$ carried thereby at 20 degree intervals for changing the gear ratio between the driving and driven shafts A and X. At each of these positions different pairs of the S gears serve to transmit power from one of the loosely mounted gears on shaft G to one of the couplets on shaft D. These arrangements are shown diagrammatically in Figs. 5 to 13 inclusive, Fig. 5 indicating the lowest gear ratio and the slowest speed and Fig. 13 indicating the highest speed ratio which is employed for the highest speed, the intermediate positions being indicated in the intermediate figures in consecutive order.

Any suitable means may be provided for rotating the sleeve. This may be done by manual means or mechanically.

As shown the rotation of the sleeve is accomplished by means of a reversible electric motor M whose shaft 12 is arranged to drive a pinion 13 (a clutch being interposed), which pinion in turn meshes with a gear 14 carried by a collar 15 splined to the end 10 of the sleeve E which carries the gear assembly. The motor is controlled from a switch mechanism actuated by a change in speed of the driving shaft.

The diagrammatic circuit shown in Fig. 2 includes a switch plate 16 also designated in Fig. 1, which is composed of non-conducting material having a pair of arcuate metal contacts 17 and 18 of limited extent, diametrically arranged at opposite sides of the plate, one being connected to the positive and the other to the negative side of a battery 19 or other source of current. A manually operable switch 20 is located in the circuit and such switch may if desired be arranged on the dashboard of the vehicle. The purpose of this switch is to render the motor and gear change mechanism non-operative under certain conditions, such as when using the compression of the motor as a brake in descending steep hills or other emergencies. The plate 16 as shown in Fig. 1 is mounted for a limited sliding movement upon the driving shaft A and for limited rotation, such movement being brought about by a centrifugal governor mounted on the shaft. As shown the sleeve 21 is splined to the shaft A and accordingly rotates therewith. On this sleeve is provided a pair of lugs 22 to which are attached hingedly connected arms 23 carrying at the upper ends balls 24 forming a centrifugal governor. A portion 25 of the governor engages a plate 26 connected to a sleeve 27 which carries the switch plate 16 at the lower end thereof. The sleeve 27 is mounted to slide on the shaft A but is connected by a pin and slot connection 28, 29 to a fixed frame member 30.

From this arrangement it will be apparent that when the driving shaft reaches a certain speed of rotation the governor balls will fly apart and the members 25 will engage the plate 26 causing the same to be moved downwardly a limited distance and at the same time rotated. With the plate 26 and sleeve 27 the switch plate 16 is moved. A coil spring 31 tends to raise the plate, acting against the force of the centrifugal governor.

It will be noted that a pair of fixed contacts 32 and 33 are arranged above the switch plate which contacts are connected one to one terminal of the motor and the other to the other. Similarly a pair of fixed contacts 34 and 35 below the switch plate are likewise connected to the motor. The contacts below the plate are so arranged as to drive the motor in a forward direction so as to increase the speed of the driven shaft with reference to the driving shaft while the contacts above are arranged to reverse the motor so as to decrease the speed ratio of the driven shaft to the driving shaft.

Figure 5:
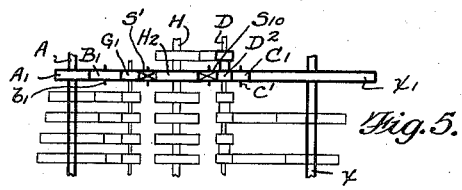
Figure 6:
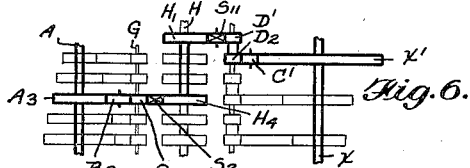
Figure 7:
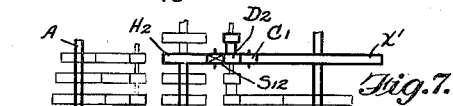
Figure 8:
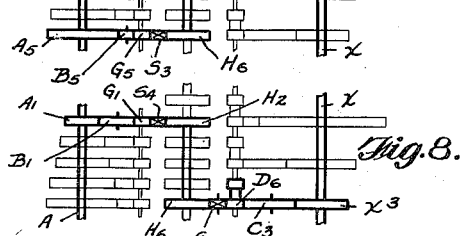
Figure 9:
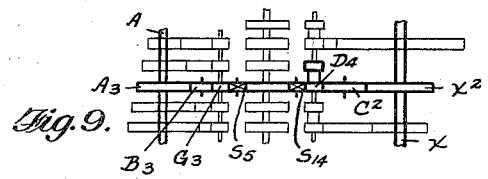
Figure 10:
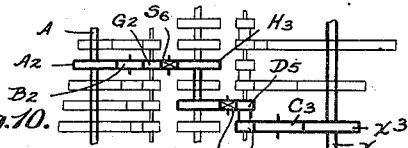
Figure 11:
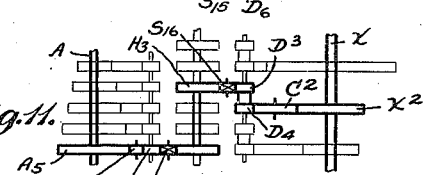
Figure 12:
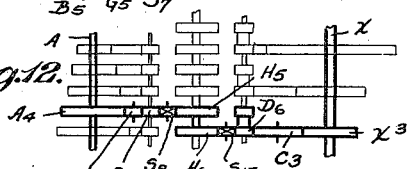
Figure 13:
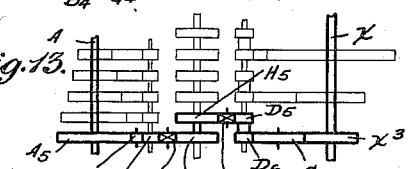

When the car is started the switch 20 is first manually opened and remains open for a short period of time during which the car will be driven at the lowest speed as indicated in Fig. 5. This allows the driving shaft to attain a certain degree of speed, whereupon the centrifugal governor will force the switch plate 16 away from the reversing contacts. The switch 20 may then be manually closed and as further speeds are attained the governor acts to force the switch plate 16 downwardly to an extent that it engages the fixed contacts below the switch plate thus closing the circuit through the motor M and causing the same to rotate the sleeve E. As shown a clutch 36 is interposed between the motor shaft 12 and the driving pinion 13. This clutch is normally held out of engagement with the driving pinion by means of a spring 37 which engages a shaft 38, a portion of which forms the coil of a solenoid 39. The lower portion of the shaft 38 is connected to a lever arm 40 which actuates the clutch. The end of the lever is adapted to engage in one of a plurality of holes 41 (Fig. 16) arranged at 20° intervals about one-half of the periphery of the gear 14. When the motor M is energized the solenoid is also energized thus causing the clutch to engage with the pinion and at the same time withdrawing the end of the shaft 38 from the hole in the gear 14 permitting rotation of the same. When the higher gear ratio is attained the increased torque tends to slow down the driving shaft, thereby permitting the force of the spring 31 to overcome the centrifugal action of the governor and forcing the plate 16 away from the contacts below the same. This cuts off current to the motor and to the solenoid whereupon the spring 37 causes the end of the shaft 38 to slip into the next hole stopping rotation of the sleeve. The momentum of the gear assembly is sufficient to carry the same through the 20 degree interval between the holes 41 on the gear 14. While the gear assembly is rotated through 20° the motor shaft is designed to make a complete revolution.

As speed is again attained by the driving shaft the operation is repeated thereby moving the sleeve another twenty degrees, or if the speed is sufficiently retarded reversing the speed twenty degrees by similar operation caused by contact between the switch plate 16 and the fixed contacts above the same which results in actuating the motor in the wrong direction.

If the sleeve is rotated in one direction to the full limit a pin 51 on the bottom of gear 14 contacts a pivoted lever 42 which lever is part of a switch. This movement opens the circuit as indicated in Fig. 2 so that no further current will flow through the motor and no further rotation of the sleeve E and gear assembly can take place no matter what the speed attained by the driving shaft.

The spring 53 is arranged to close the switch as soon as pressure of the pin 51 is removed thus restoring the circuit to its original condition. When speed is reduced the sleeve will be automatically rotated in the reversed direction thus decreasing the speed ratio.

For some purposes it may be desirable to reduce the feed of gas to the carburetor momentarily when the gear assembly is being turned in shifting from one speed ratio to another. Automatic means for accomplishing this result are shown in Figs. 1 and 15. The cam 43 is actuated by the shaft of the motor M, and during rotation the cam engages a member 44 which is connected through a bell crank 45 to a rod 46 that controls the carburetor. Connection is also made with the accelerator pedal 47.

The operation of the device is apparent from the preceding description and need not be further described.

It will be apparent that while the invention has been described in detail for the purpose of illustration, many modifications and variations may be resorted to without departing from the spirit of the invention.

I claim:—

1. Power transmission mechanism including a driving shaft having gears of different sizes keyed thereto, a driven shaft also having gears of different sizes keyed thereto, and an intermediate rotatable gear assembly including a plurality of pairs of gears, arranged in staggered relation, successive pairs of gears being adapted to transmit power in each of a plurality of positions, one gear of each pair arranged to be driven by a gear on said driving shaft, the other gear of the pair being driven thereby and in turn driving a gear on the driven shaft, and means for rotating said gear assembly through predetermined angles for the purpose of bringing successive pairs of gears of said gear assembly into operation relative with successive gears on said driving and driven shafts.

2. Power transmission mechanism including a driving shaft having gears of different sizes rotating therewith, a driven shaft also having gears of different sizes rotating therewith, and an intermediate rotatable gear assembly including a plurality of pairs of gears, arranged in staggered relation, successive pairs of gears being adapted to transmit power in each of a plurality of positions, one gear of each pair arranged to be driven by a gear on said driving shaft, the other gear of the pair being driven thereby and in turn driving a gear on the driven shaft, and means for rotating said gear assembly through predetermined angles for the purpose of bringing successive pairs of gears of said gear assembly into operation relative with successive gears on said driving and driven shafts.

3. Power transmission mechanism including a driving shaft having gears of different sizes rotating therewith, a driven shaft also having gears of different sizes rotating therewith, and an intermediate rotatable gear assembly including a plurality of pairs of gears, arranged in staggered relation, successive pairs of gears being adapted to transmit power in each of a plurality of positions, one gear of each pair arranged to be driven by a gear on said driving shaft, the other gear of the pair being driven thereby and in turn driving a gear on the driven shaft, and means for rotating said gear assembly through predetermined angles for the purpose of bringing successive pairs of gears of said gear assembly into operation relative with successive gears on said driving and driven shafts, said gear assembly including a sleeve having bearings in which the shafts of the pairs of gears are mounted and having slots through which the toothed surfaces of the gears project.

ROE HUTCHINGS.